United States Patent [19]

Nakanishi et al.

[11] Patent Number: 5,753,720

[45] Date of Patent: May 19, 1998

[54] HARDENABLE ORGANOPOLYSILOXANE COMPOSITIONS

[75] Inventors: Junji Nakanishi, Ichihara; Makoto Yoshitake, Funabashi, both of Japan

[73] Assignee: Dow Corning Toray Silicone Co., Ltd., Tokyo, Japan

[21] Appl. No.: 792,006

[22] Filed: Jan. 31, 1997

[30] Foreign Application Priority Data

Jan. 31, 1996 [JP] Japan .................. 8-037489

[51] Int. Cl.$^6$ .................. C08F 2/45
[52] U.S. Cl. .................. 522/33; 427/503; 428/446; 428/447; 428/452; 522/39; 522/45; 522/46; 522/172; 522/99; 528/12; 528/17; 528/18; 528/30; 525/477
[58] Field of Search .................. 528/30, 12, 17, 528/18; 525/477; 522/33, 39, 45, 46, 172, 99; 427/503; 428/447, 446, 452

[56] References Cited

U.S. PATENT DOCUMENTS

| | | | |
|---|---|---|---|
| 4,579,636 | 4/1986 | Inoue et al. | 522/99 |
| 4,735,971 | 4/1988 | Inoue et al. | 522/42 |
| 4,742,092 | 5/1988 | Inoue et al. | 522/27 |
| 5,371,116 | 12/1994 | Sakamoto et al. | 522/33 |
| 5,684,113 | 11/1997 | Nakanishi et al. | 528/30 |

FOREIGN PATENT DOCUMENTS

| | | |
|---|---|---|
| 0332400 A2 | 9/1989 | European Pat. Off. . |
| 5-295271 | 11/1993 | Japan . |
| 5-295272 | 11/1993 | Japan . |
| 6-57143 | 3/1994 | Japan . |

*Primary Examiner*—Melvyn I. Marquis
*Attorney, Agent, or Firm*—Timothy J. Troy

[57] ABSTRACT

The present invention relates to a hardenable organopolysiloxane composition having a viscosity of less than 30,000 Poise at 25° C. comprising (A) 30 to 75 wt % of a silicone resin, (B) 70 to 25 wt % of a mercapto functional organopolysiloxane, (C) 0.1 to 10 parts by weight per 100 parts by weight of (A)+(B) of a mercapto functional organosilane, and (D) 0.01 to 10 parts by weight per 100 parts by weight of (A)+(B) of a condensation catalyst. The present invention also relates to an article of manufacture obtained by applying the hardenable organopolysiloxane composition to a substrate, exposing the composition and substrate to high energy radiation, and then applying a solid support to the coated substrate.

30 Claims, No Drawings

HARDENABLE ORGANOPOLYSILOXANE COMPOSITIONS

BACKGROUND OF THE INVENTION

The present invention relates to a hardenable organopolysiloxane composition and an article of manufacture obtained by applying the above composition to a substrate and then applying a solid support to the substrate. More specifically, the invention relates to a hardenable organopolysiloxane composition that maintains flowability under closed conditions and in the absence of light and that quickly loses its flowability and which when exposed to ultraviolet rays, electron beams, or a similar high-energy radiation transforms into a non-flowable viscous substance and then further interacts with the humid air of the atmosphere and is turned into an elastic body.

Since one-liquid type room-temperature hardenable organopolysiloxane compositions possess excellent resistance to heat, good electrical characteristics, and improved weatherproof properties, they find application as adhesives, potting agents, and coating agents. However, since humid air initiates a condensation reaction in conventional one-liquid type room-temperature hardenable organopolysiloxane compositions, a significant amount of time is required for completion of the hardening. Therefore, compositions have been proposed that allow a combination of a conventional humid-air hardening reaction with a hardening reaction caused and accelerated by high-energy beams such as those disclosed in Japanese Patent Application Laid-Open Nos. 60-231761 (231,761/1985), 62-96562 (96,562/1987), 62-197453 (197,453/191987), 5-295271 (295,271/1993), 5-295272 (295,272/1993), 6-32985 (32,985/1994), 6-57143 (57,143/1994), and Japanese Patent Publication No. 5-63514 (63,514/1993). Under the effect of ultraviolet or similar radiation, the above compositions become thicker and develop adhesiveness to the object. Therefore, when the irradiated surface is brought in contact with the object, the latter can be attached to the irradiated surface through adhesion. However, even though the aforementioned composition is thickened, it still remains flowable and therefore cannot develop sufficient adhesiveness, especially if the thickness of the adhesive layer is of an order of several millimeters and the initial adhesiveness is very low.

SUMMARY OF THE INVENTION

The present invention relates to a hardenable organopolysiloxane composition having a viscosity of less than 30,000 Poise (1 Poise (P)=0.1 Pascal-second (Pa·s)) at 25° C. comprising (A) 30 to 75 wt % of a silicone resin, (B) 70 to 25 wt % of a mercapto functional organopolysiloxane, (C) 0.1 to 10 parts by weight per 100 parts by weight of (A)+(B) of a mercapto functional organosilane, and (D) 0.01 to 10 parts by weight per 100 parts by weight of (A)+(B) of a condensation catalyst.

It is an object of the present invention to provide a hardenable organopolysiloxane composition and an article of manufacture obtained by applying the above composition to a substrate and then applying a solid support to the coated substrate.

Another object of the invention is to produce a composition which has flowability when it is kept under closed conditions and in the absence of light but quickly loses its flowability and becomes viscous when irradiated with high-energy beams such as ultraviolet radiation or electron beams, and then turns into an elastic body after hardening because of a reaction with the moisture of the surrounding air.

DETAILED DESCRIPTION OF THE INVENTION

The present invention relates to a hardenable organopolysiloxane composition having a viscosity of less than 30,000 Poise at 25° C. comprising (A) 30 to 75 wt. % of a silicone resin having the average unit formula $R_a^1SiO_{(4-a)/2}$ wherein $R^1$ is selected from the group consisting of monovalent hydrocarbon groups and alkoxy groups with the proviso that $R^1$ contains at least 80 mole % monovalent hydrocarbon groups and that at least 2 mole % of the monovalent hydrocarbon groups are alkenyl groups, and a is a number between 0.75 and 2.5, (B) 70 to 25 wt. % of an organopolysiloxane having a viscosity of 1 to 1000 Poise at 25° C. and having at one of its terminals a mercaptosiloxy group having the formula

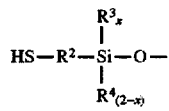

wherein $R^2$ is an alkylene group having 1 to 10 carbon atoms, $R^3$ is an alkoxy group, $R^4$ is an alkyl group, and x has a value of 1 or 2, the organopolysiloxane being free of alkenyl groups, (C) 0.1 to 10 parts by weight per 100 parts by weight of (A)+(B) of an organosilane having the formula $(HSR^5)R_y^6SiR_{(3-y)}^7$ wherein $R^5$ is an alkylene group having from 1 to 10 carbon atoms, $R^6$ is an alkoxy group, $R^7$ is an alkyl group, and y is an integer from 1 to 3, and (D) 0.01 to 10 parts by weight per 100 parts by weight of (A)+(B) of a condensation catalyst.

The silicone resin of component (A) imparts adhesive properties to the hardenable composition after exposure to high-energy radiation. Monovalent hydrocarbon groups suitable as $R^1$ are exemplified by alkyl groups such as methyl, ethyl, propyl, butyl, pentyl, isopropyl, isobutyl, cyclopentyl, or cyclohexyl, alkenyl groups such as vinyl, allyl, or hexenyl, aryl groups such as phenyl or naphthyl, an aralkyl group such as a benzyl, 1-phenylethyl, a halogenated alkyl group such as chloromethyl, 3-chloropropyl, 3,3,3-trifluoropropyl group, nonafluorobutylethyl, a halogenated aryl group such as 4-chlorophenyl, 3,5-dichlorophenyl, or 3,5-difluorophenyl, or a halogenated alkyl substituted aryl group such as 4-chloromethyl phenyl or 4-trifluoromethyl phenyl. Furthermore, it is required that the monovalent hydrocarbon group contain alkenyl groups in an amount of at least 2 mole % and preferably 2 to 10 mole %. It is preferred that the alkenyl group is vinyl and that the monovalent hydrocarbon groups other than the alkenyl group be methyl. The alkoxy groups of $R^1$ are preferably selected from methoxy, ethoxy, or propoxy with methoxy being preferred. The subscript a should have a value of 0.75 to 2.5.

Furthermore, within the context of the present invention the term "silicone resin" covers the following silicone resins: a silicone MQ resin which comprises an organopolysiloxane that contains in its molecule three-functional units (T units) having the formula $R^1SiO_{3/2}$ wherein $R^1$ is as defined above, or four-functional units (Q units) having the formula $SiO_{4/2}$, with a main component that consists of siloxane units (M units) having the formula $R_3^1SiO_{1/2}$ and siloxane (Q units) having the formula $SiO_{4/2}$; a silicone MTQ resin that consists of siloxane units of formula $R_3^1SiO_{1/2}$, siloxane units of formula $R^1SiO_{3/2}$, and siloxane units of formula $SiO_{4/2}$; a silicone MDQ resin that consists of siloxane units of the formula $R_3^1SiO_{1/2}$, siloxane units (D units) of the formula $R_2^1SiO_{2/2}$ and siloxane units of the formula $SiO_{4/2}$; a silicone MDTQ resin that consists of siloxane units of the formula $R_3^1SiO_{1/2}$, siloxane units of the formula $R_2^1SiO_{2/2}$, siloxane units of formula $R^1SiO_{3/2}$, and siloxane units of formula $SiO_{4/2}$; and a silicone resin consisting of silicone units of formula $R^1SiO_{3/2}$. The most preferred silicone resins are silicone resins having their formula selected from $(R_3^8SiO_{1/2})_b(SiO_{4/2})_c$ or $(R_3^8SiO_{1/2})_d(R^8SiO_{3/2})_e(SiO_{4/2})_f(R^9O_{1/2})_g$. In the above formulae, $R^8$ denotes a monovalent hydrocarbon group containing alkenyl groups in an amount of more than 2 mole %. The groups of $R^8$ may be the same as or different from the monovalent hydrocarbon groups of $R^1$; $R^9$ denotes an alkyl group such as methyl, ethyl, or propyl. The alkoxy group represented by the formula ($R^9O_{1/2}$) is bonded to a silicon atom. The ratio of b/c and d/f should range from 0.2 to 1.5, and preferably from 0.5 to 1.2. The ratio of e/f preferably ranges from 0.05 to 0.2, and the ratio of g/f preferably ranges from 0.05 to 0.6. The silicone resins preferably have a number-average molecular weight ranging from 1,000 to 10,000 and preferably from 3,000 and 6,000.

Organopolysiloxanes suitable as component (A) are preferably selected from the group consisting of $(Me_3SiO_{1/2})_{36}(Me_2ViSiO_{1/2})_5(SiO_{4/2})_{59}$, $(Me_3SiO_{1/2})_{40}(Me_2ViSiO_{1/2})_5(SiO_{4/2})_{55}$, $(Me_3SiO_{1/2})_{36}(Me_2ViSiO_{1/2})_5(MeSiO_{3/2})_5(SiO_{4/2})_{59}$, $(Me_3SiO_{1/2})_{40}(ViSiO_{3/2})_7(SiO_{4/2})_{60}(MeO_{1/2})_{10}$, $(Me_3SiO_{1/2})_{36}(Me_2ViSiO_{1/2})_5(MeSiO_{3/2})_5(SiO_{4/2})_{59}(MeO_{1/2})_{15}$, and $(Me_3SiO_{1/2})_{35}(Me_2ViSiO_{1/2})_5(SiO_{4/2})_{60}(MeO_{1/2})_{10}$.

wherein Me denotes methyl and Vi denotes vinyl.

Component (B) is an organopolysiloxane having a terminal mercaptosiloxy group having the formula

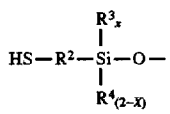

wherein $R^2$ is an alkylene group having 1 to 10 carbon atoms exemplified by methylene, ethylene, propylene, isobutylene, and decylene. $R^3$ is an alkoxy group exemplified by methoxy, ethoxy, propoxy, isopropoxy, butoxy, and isobutoxy, and it is preferred that $R^3$ is selected from methoxy or ethoxy; $R^4$ is an alkyl group such as methyl, ethyl, propyl, butyl, pentyl, isopropyl, isobutyl, cyclopentyl, or cyclohexyl; and x has a value of 1 or 2. The mercaptosiloxy groups may be bonded to parts of the terminals or to all terminals. At 25° C. this component can have a viscosity ranging from 1 to 1,000 Poise, and preferably between 10 and 800 Poise. If the viscosity is less than 1 Poise, the composition of the present invention will be too liquid and will require an extremely high energy of irradiation for bringing it to a non-flowable state, or it will still have low viscosity even after the irradiation. If, on the other hand, the viscosity is higher than 1,000 Poise, the composition will be too viscous, will present a problem for handling, and will have a reduced adhesion after irradiation with high energy. The organopolysiloxane (B) may have a linear or a partially-branched molecular structure. Furthermore, this component may have groups other than the mercaptosiloxy groups above which contain mercapto groups bonded to the silicon atom such as monovalent hydrocarbon groups or mercapto-containing organic groups other than alkenyl groups. The monovalent hydrocarbon groups are exemplified by methyl, ethyl, propyl, butyl, pentyl, isopropyl, isobutyl, cyclopentyl, or cyclohexyl, an aryl group exemplified by phenyl, or naphthyl, an aralkyl group exemplified by benzyl or 1-phenylethyl, halogenated alkyl group exemplified by chloromethyl, 3-chloropropyl, 3,3,3-trifluoropropyl, or nonafluorobutylethyl, a halogenated aryl group exemplified by 4-chlorophenyl, 3,5-dichlorophenyl, or 3,5-difluorophenyl, a halogenated alkyl substituted aryl group exemplified by 4-chloromethyl phenyl or 4-trifluoromethyl phenyl. Preferred as the monovalent hydrocarbon group is methyl. Mercapto-containing organic groups are exemplified by mercaptopropyl and mercaptomethyl.

The organopolysiloxane (B) is preferably selected from the group consisting of

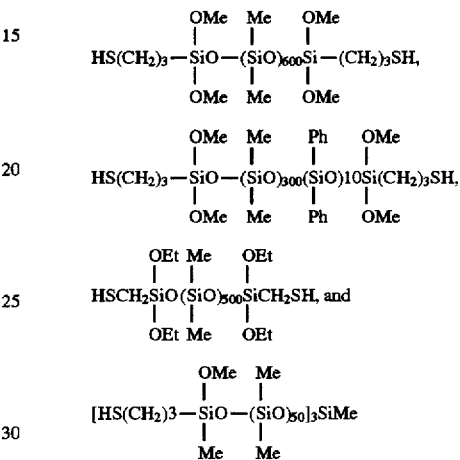

wherein Me denotes methyl, Et denotes ethyl, and Ph denotes phenyl.

The mercapto-containing organosilane (C) increases the adhesive holding capacity (hereinafter referred to as "initial adhesiveness") of the composition of the present invention (an adhesive body) after it has been irradiated with high energy beams. This component is represented by the general formula: $(HSR^5)R_y^6SiR_{(3-y)}^7$. In the formula, $R^5$ denotes an alkylene group having 1 to 10 carbon atoms exemplified by methylene, ethylene, propylene, isobutylene, and decylene. $R^6$ is an alkoxy group exemplified by methoxy, ethoxy, propoxy, isopropoxy, butoxy, and isobutoxy, however it is preferred that $R^6$ is selected from methoxy or ethoxy, R7 denotes an alkyl group exemplified by methyl, ethyl, propyl, butyl, pentyl, isopropyl, isobutyl, cyclopentyl, and cyclohexyl, y is an integer between 1 and 3 preferably y has a value of 2 or 3.

Component (C) is preferably selected from the group consisting of $HS(CH_2)_3Si(OMe)_3$, $HS(CH_2)_4Si(OMe)_3$, $HS(CH_2)_3Si(OEt)_3$, $HS(CH_2)_3SiMe(OEt)_2$, and $HSCH_2Si(OMe)_3$ wherein Me denotes methyl and Et denotes ethyl.

Component (D) is a condensation catalyst which accelerates the hydrolysis of and the condensation reaction of alkoxy groups in components (A) through (C). Component (D) may be a known condensation catalyst exemplified by tetraalkoxy titanium compounds such as tetraisopropoxy titanium or tetrabutoxy titanium, a titanium complex compound such as diisopropoxybis(acetoacetic ethyl) titanium, diisopropoxybis(acetylacetone) titanium, dibutoxybis-(acetoacetic methyl) titanium, a dialkyltin carboxylate compound such as dibutyltin diacetate, dibutyltin dioctoate, or dibutyltin dilaurate, or a tin carboxylate compound such as stannous octoate. Preferably component (D) is selected from a tetraalkoxy titanium compound or a titanium complex compound.

The composition of the present invention comprises a mixture of 30 to 75 wt % of component (A), 70 to 25 wt % component (B), component (C) added in an amount of 0.1 to 10 parts by weight per 100 parts by weight of (A)+(B), and component (D) added in an amount of 0.01 to 10 parts by weight per 100 parts by weight of (A)+(B). If component (C) is used in an amount of less than 0.1 parts by weight, it would be difficult to obtain good initial adhesiveness when the layer of the composition of the present invention is thicker than several millimeters. Furthermore, in order to facilitate the formation of a viscous body by irradiating the composition of the invention with ultraviolet rays, electron beams, or a similar high-energy radiation, it is recommended that a mole ratio of the alkenyl groups in component (A) to the total amount of mercapto groups in components (B) and (C) be within the range of 1:2 to 20:1.

The composition of the present invention comprises components (A) through (D), but in order to facilitate the formation of a viscous body by irradiating the composition of the invention with ultraviolet rays, electron beams, or a similar high-energy radiation, a radical optical polymerization initiator can be added as a component (E). Radical optical polymerization initiators suitable for the invention are exemplified by acetophenones such as trichloroacetophenone, 2,2-diethoxy acetophenone, 2,2-dimethoxy-2-phenyl-acetophenone, a benzophenone exemplified by benzophenone, methyl benzophenone, p-chlorobenzophenone, or p-dimethylamino benzophenone. It is preferred that the radical optical polymerization initiator be used in an amount from 0.1 to 5 parts by weight, preferably 0.2 to 3 parts by weight per 100 parts by weight of (A)+(B). If necessary, the composition of the present invention may be combined with a storage stabilizer which is free of mercapto groups, a filler such as a fumed silica, a functional or non-functional organopolysiloxane gum, a plasticizer, a thixotropic donor, a high-temperature additive, a coloring agent, an adhesion donor, or a similar additive.

It is recommended that at 25° C. the composition of the present invention have a viscosity of less than 30,000 Poise, preferably between 100 and 20,000 Poise. If the viscosity exceeds 30,000 Poise, it would be difficult to apply the composition on various substrates.

The composition of the present invention is prepared by mixing components (A) through (D), and optionally (E), but it is preferable to perform mixing in a dark and non-humid environment. If it is not possible to shade the environment from light, the mixing should be performed in a dry atmosphere in the presence of oxygen.

Upon exposure to ultraviolet rays, electron beams or a similar high-energy radiation, the composition of the present invention quickly turns into a pressure-sensitive adhesive material. This material maintains adhesive properties for a period of 10 minutes to 2 hours, and then under a cross-linking reaction caused by interaction with the moisture of the surrounding atmosphere the adhesive material becomes elastic. Especially in the case where the composition of the invention has a thickness of about several millimeters, it is expedient to utilize the initial adhesiveness of the composition. Therefore the composition of the present invention may be advantageously used as an adhesive agent. In particular, if the pressure-adhesion properties are maintained over a certain time, the composition can be used for forming a laminated article and if it is retained in the surrounding atmosphere, it may be used for forming a bonded laminated article.

The present invention further relates to an article of manufacture prepared by applying the composition of this invention onto a substrate, then exposing the composition and substrate to high-energy radiation such as electron beam, or ultraviolet rays, and then applying a solid support onto the irradiated surface, and the article is then left without further treatment in the atmosphere. Substrates which can be treated with the compositions of this invention and solid supports which can be used in the preparation of the article include glass plates, copper plates, iron plates, stainless steel plates, aluminum plates, zinc plates, high-quality paper, low-grade paper, polyester resin films, polycarbonate resin films, polystyrene films, acrylic resin films, methacrylic resin films, nylon resin films, or similar plates or films; natural fibers, synthetic fibers, natural rubbers, synthetic rubbers, or similar rubber sheets. The composition may be applied by brushing, bar coating, spin coating, or by any other suitable method. It is preferable to apply the composition in an amount that forms a coating film having a thickness within the range of 10 µm to 5 mm. The high-energy rays suitable for irradiation may be radioactive rays, electron beams, ultraviolet beams, or similar beams irradiated from high-pressure mercury lamps, xenone lamps, or metal-halide lamps. Ultraviolet radiation covers visible light from such sources as the sun or fluorescent lamps. In the case of the ultraviolet radiation the amount of irradiation should be within the range of 20 to 5000 mJ/cm$^2$. In the case of electron-beam rays and radioactive rays the amount of irradiation should be within the range of 0.5 to 50 Mrad. It is recommended that the solid support be brought into contact with the irradiated substrate within 10 minutes to 2 hours after the substrate has been exposed to radiation. The retention time in the atmosphere should be between 2 hours and 100 hours.

The method of the invention is advantageous in that the adhesive connection remains sufficiently strong directly after the application of the solid support onto the substrate, even if the layer of the applied composition is on the order of several millimeters. Furthermore, adhesion of the solid support to the substrate is completed due to interaction of the composition with the moisture contained-in the surrounding atmosphere.

In the following examples, viscosity was measured at 25° C., Me denotes methyl and Vi denotes vinyl. Tension shear adhesion strength of the hardenable organopolysiloxane composition was measured in the following manner: a hardenable organopolysiloxane composition was applied in a uniform 1-mm thick layer (to form a coating film of about 100 µm in thickness both in the case of Example 1 and Comparative Example 1) onto a glass test panel having a thickness of 5 mm and a width of 2.5 mm. One minute later, the coated surface was exposed to ultraviolet rays having an energy of 300 mJ/cm$^2$ with the use of a conveyor-type ultraviolet radiation apparatus (a 120 Watt high-pressure mercury lamp). After irradiation, the treated panel was left intact for 1 minute and then a second glass test panel, similar to the first-mentioned test panel, was applied onto the treated one with the adhesion areas of 2.5 cm$^2$. The tension shear adhesion strength was measured (in kg/cm$^2$) in accordance with the provisions of JIS (Japanese Industrial Standard) K6850 after predetermined time intervals (1 min, 2 hours, 4 hours, 24 hours, 1 week).

EXAMPLE 1

After uniformly mixing 71.4 g of a 70% xylene solution of silicone resin having a number-average molecular weight of 4,600 and having the formula:

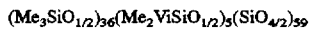

and 50.0 g of a dimethylpolysiloxane having a viscosity of 39 Poise, and containing mercaptosiloxy groups on both terminals, and having the formula

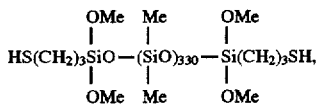

this mixture was heated under vacuum, and then the xylene was removed. After cooling, the product was combined with 1.0 g of 3-mercaptopropyl trimethoxy silane, 0.5 g of 2,2-dimethoxy-2-phenyl acetophenone, 1.0 g of tetrabutoxy titanium, and 2.0 g of methyl trimethoxy silane. The components were then uniformly mixed in a dry atmosphere. The resulting hardenable organopolysiloxane composition had a viscosity of 310 Poise. The obtained composition was measured with regard to tension shear adhesion strength as described above. The results of the measurement are shown in Table 1. Observation with the naked eye of the hardened material about one week after application of the second test panel to the treated one showed cohesive destruction. This condition shows that the two test panels have a very strong connection to each other, and it can be assumed that the initial adhesiveness directly after the irradiation of the composition with ultraviolet rays as well as the subsequent hardening of the composition under the effect of the moisture of the surrounding air are appropriate.

EXAMPLE 2

After uniformly mixing 78.6 g of a 70% xylene solution of silicone resin having a number-average molecular weight of 3,800 and having the formula:

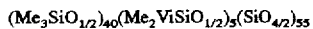

and 45.0 g of a dimethylpolysiloxane having a viscosity of 116 Poise and containing mercaptosiloxy groups on both terminals, and having the formula:

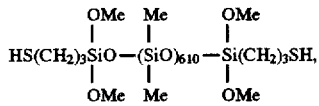

the mixture was heated under vacuum, and the xylene was removed. After cooling, the product was combined with 1.0 g of 3-mercaptopropyl trimethoxy silane, 0.5 g of 2,2-diethoxy acetophenone, 1.0 g of tetrabutoxy titanium, and 2.0 g of methyl trimethoxy silane. The components were then uniformly mixed in a dry atmosphere. The resulting hardenable organopolysiloxane composition had a viscosity of 180 Poise. The obtained composition was measured with regard to tension shear adhesion strength. The results of the measurement are shown in Table 1. Observation with the naked eye of the hardened material about one week after application of the second test panel to the treated one showed cohesive destruction. This condition shows that the two test panels have a very strong connection to each other, and it can be assumed that the initial adhesiveness directly after the irradiation of the composition with ultraviolet rays as well as the subsequent hardening of the composition under the effect of the moisture of the surrounding air are appropriate.

EXAMPLE 3

After uniformly mixing 85.7 g of a 70% xylene solution of silicone resin having a number-average molecular weight of 3,300 and having the formula:

and 40.0 g of a dimethylpolysiloxane having a viscosity of 39 Poise, and containing mercaptosiloxy groups on both terminals, and having the formula:

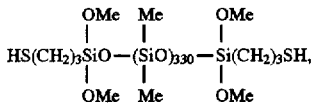

the mixture was heated under vacuum, and the xylene removed. After cooling, the product was combined with 1.0 g of 3-mercaptopropyl trimethoxy silane, 0.5 9 of 2,2-dimethoxy-2-phenyl acetophenone, 1.0 g of tetrabutoxy titanate, and 2.0 g of methyl trimethoxy silane. The components were then uniformly mixed in a dry atmosphere. The resulting hardenable organopolysiloxane composition had a viscosity of 330 Poise. The obtained composition was measured with regard to tension shear adhesion strength. The results of the measurement are shown in Table 1. Observation with the naked eye of the hardened material about one week after application of the second test panel to the treated one showed cohesive destruction. This condition shows that the two test panels have a very strong connection to each other, and it can be assumed that the initial adhesiveness directly after the irradiation of the composition with ultraviolet rays as well as the subsequent hardening of the composition under the effect of the moisture of the surrounding air are appropriate.

Comparative Example 1

After uniformly mixing 71.4 g of a 70% xylene solution of silicone resin having a number-average molecular weight of 4,600 and having the formula:

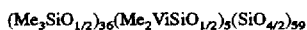

and 50.0 g of a dimethylpolysiloxane having a viscosity of 39 Poise, having mercaptosiloxy groups on both terminals, and having the formula:

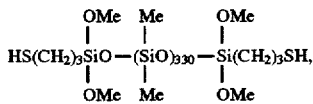

the mixture was heated under vacuum, and the xylene removed. After cooling, the product was combined with 0.5 g of 2,2-dimethoxy-2-phenyl acetophenone, 1.0 g of tetrabutoxy titanate, and 2.0 g of methyl trimethoxy silane. The components were then uniformly mixed in a dry atmosphere. The resulting hardenable organopolysiloxane composition had a viscosity of 1600 Poise. The obtained composition was measured with regard to tension shear adhesion strength. The results of the measurement are shown in Table 1. Observation with the naked eye of the hardened material about one week after application of the second test panel to the treated one showed cohesive destruction.

Comparative Example 2

After uniformly mixing 71.4 g of a 70% xylene solution of silicone resin having a number-average molecularweight of 4,300 and having the formula $(Me_3SiO_{1/2})_{42}(SiO_{4/2})_{58}$, 26.0 g of a dimethylpolysiloxane having a viscosity of 39 Poise, having mercaptosiloxy groups on both terminals, and having the formula

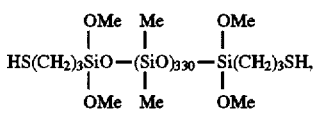

and 24.0 g of vinyl-containing dimethylpolysiloxane having the formula

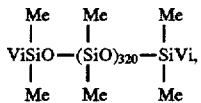

the mixture was heated under vacuum, and the xylene removed. After cooling, the product was combined with 1.0 g of 3-mercaptopropyl trimethoxy silane, 0.5 g of 2,2-dimethoxy-2-phenyl acetophenone, 1.0 g of tetrabutoxy titanate, and 2.0 g of methyl trimethoxy silane. The components were then uniformly mixed in a dry atmosphere. The resulting hardenable organopolysiloxane composition had a viscosity of 290 Poise. The obtained composition was measured with regard to tension shear adhesion strength. The results of the measurement are shown in Table 1. Observation with the naked eye of the deterioration conditions on the article about one week after the application of the second test panel to the treated one showed peeling over the interface. This means that two test panels did not have a strong connection and that the initial adhesiveness of the composition directly after exposure to ultraviolet radiation was insufficient.

TABLE 1

| | Tensile Shear Adhesion Strength | | | | |
|---|---|---|---|---|---|
| | after 1 min. | after 2 hrs. | after 4 hrs. | after 24 hrs. | after 1 week |
| Ex. 1 Thickness: | | | | | |
| 1 μm | 0.50 | 2.79 | 3.56 | 6.70 | 7.42 |
| 1 mm | 1.56 | 1.60 | 1.62 | 7.33 | 13.96* |
| Ex. 2 Thickness: | | | | | |
| 1 mm | 1.83 | 1.92 | 1.94 | 7.48 | 11.77* |
| Ex. 3 Thickness: | | | | | |
| 1 mm | 1.37 | 1.42 | 1.45 | 6.89 | 14.36* |
| Comp. Ex. 1 Thickness: | | | | | |
| 100 μm | 0.38 | 1.95 | 3.26 | 7.08 | 7.67 |
| 1 mm | 0.24 | 0.51 | 0.90 | 3.20 | 9.14* |
| Comp. Ex. 2 | 0.22 | 0.46 | 0.76 | 2.43 | 5.89 |
| | | | | | (peeling over the interface) |

*-denotes cohesive destruction

That which is claimed is:

1. A hardenable organopolysiloxane composition having a viscosity of less than 30,000 Poise at 25° C. comprising:

(A) 30 to 75 wt. % of a silicone resin having the average unit formula $R_a^1SiO_{(4-a)/2}$ wherein $R^1$ is selected from the group consisting of monovalent hydrocarbon groups and alkoxy groups with the proviso that $R^1$ contains at least 80 mole % monovalent hydrocarbon groups and that at least 2 mole % of the monovalent hydrocarbon groups are alkenyl groups, and a is a number between 0.75 and 2.5;

(B) 70 to 25 wt. % of an organopolysiloxane having a viscosity of 1 to 1000 Poise at 25° C. and having at one of its terminals a mercaptosiloxy group having the formula

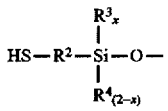

wherein $R^2$ is an alkylene group having 1 to 10 carbon atoms, $R^3$ is an alkoxy group, $R^4$ is an alkyl group, and x has a value of 1 or 2, the organopolysiloxane being free of alkenyl groups;

(C) 0.1 to 10 parts by weight per 100 parts by weight of (A)+(B) of an organosilane having the formula $(HSR^5)R_y^6SiR_{(3-y)}^7$ wherein $R^5$ is an alkylene group having from 1 to 10 carbon atoms, $R^6$ is an alkoxy group, $R^7$ is an alkyl group, and y is an integer from 1 to 3; and (D) 0.01 to 10 parts by weight per 100 parts by weight of (A)+(B) of a condensation catalyst.

2. A composition according to claim 1, wherein the alkoxy group is selected from the group consisting of methoxy, ethoxy, and propoxy.

3. A composition according to claim 1, wherein (A) is a silicone resin having its formula selected from $(R_3^8SiO_{1/2})_b(SiO_{4/2})_c$ or $(R_3^8SiO_{1/2})_d(R^8SiO_{3/2})_e(SiO_{4/2})_f(R^9O_{1/2})_g$ wherein $R^8$ denotes a monovalent hydrocarbon group containing alkenyl groups in an amount of more than 2 mole %, $R^9$ denotes an alkyl group, the ratio of b/c and d/f is from 0.2 to 1.5, the ratio of e/f is from 0.05 to 0.2, and the ratio of g/f is from 0.05 to 0.6.

4. A composition according to claim 1, wherein (A) is selected from the group consisting of $(Me_3SiO_{1/2})_{36}(Me_2ViSiO_{1/2})_5(SiO_{4/2})_{59}$, $(Me_3SiO_{1/2})_{40}(Me_2ViSiO_{1/2})_5(SiO_{4/2})_{55}$, $(Me_3SiO_{1/2})_{36}(Me_2ViSiO_{1/2})_5(MeSiO_{3/2})_5(SiO_{4/2})_{59}$, $(Me_3SiO_{1/2})_{40}(ViSiO_{3/2})_7(SiO_{4/2})_{60}(MeO_{1/2})_{10}$, $(Me_3SiO_{1/2})_{36}(Me_2ViSiO_{1/2})_5(MeSiO_{3/2})_5(SiO_{4/2})_{59}(MeO_{1/2})_{15}$, and $(Me_3SiO_{1/2})_{35}(Me_2ViSiO_{1/2})_5(SiO_{4/2})_{60}(MeO_{1/2})_{10}$.

wherein Me denotes methyl and Vi denotes vinyl.

5. A composition according to claim 1, wherein the alkylene group is selected from the group consisting of methylene, ethylene, propylene, isobutylene, and decylene, the alkoxy group is selected from the group consisting of methoxy, ethoxy, propoxy, isopropoxy, butoxy, and isobutoxy, and the alkyl group is selected from the group consisting of methyl, ethyl, propyl, butyl, pentyl, isopropyl, isobutyl, cyclopentyl, and cyclohexyl.

6. A composition according to claim 1, wherein (B) is selected from the group consisting of

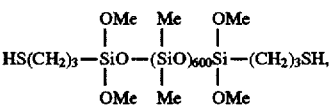

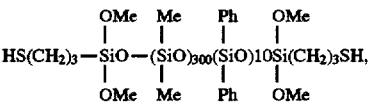

-continued

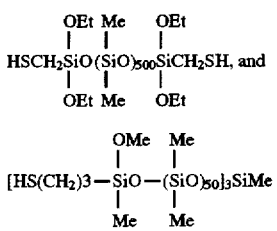

HSCH$_2$SiO(SiO)$_{500}$SiCH$_2$SH, and

[HS(CH$_2$)$_3$—SiO—(SiO)$_{50}$]$_3$SiMe (with OMe and Me substituents)

wherein Me denotes methyl, Et denotes ethyl, and Ph denotes phenyl.

7. A composition according to claim 1, wherein R$^5$ is selected from the group consisting of methylene, ethylene, propylene, isobutylene, and decylene, R$^6$ is selected from the group consisting of methoxy, ethoxy, propoxy, isopropoxy, butoxy, and isobutoxy, and R$^7$ is selected from the group consisting of methyl, ethyl, propyl, butyl, pentyl, isopropyl, isobutyl, cyclopentyl, and cyclohexyl.

8. A composition according to claim 1, wherein (C) is selected from the group consisting of HS(CH$_2$)$_3$Si(OMe)$_3$, HS(CH$_2$)$_4$Si(OMe)$_3$, HS(CH$_2$)$_3$Si(OEt)$_3$, HS(CH$_2$)$_3$SiMe (OEt)$_2$, and HSCH$_2$Si(OMe)$_3$ wherein Me denotes methyl and Et denotes ethyl.

9. A composition according to claim 1, wherein (D) is selected from the group consisting of tetraalkoxy titanium compounds, titanium complexes, dialkyltin carboxylate compounds, and tin carboxylate compounds.

10. A composition according to claim 1, wherein (D) is selected from the group consisting of tetraisopropoxy titanium, tetrabutoxy titanium, diisopropoxybis(acetoacetic ethyl) titanium, diisopropoxybis(acetylacetone) titanium, dibutoxybis- (acetoacetic methyl) titanium, dibutyltin diacetate, dibutyltin dioctoate, dibutyltin dilaurate, and stannous octoate.

11. A composition according to claim 1, wherein the composition further comprises (E) a radical optical polymerization initiator.

12. A composition according to claim 11, wherein (E) is selected from the group consisting of acetophenones and benzophenones.

13. A composition according to claim 11, wherein (E) is selected from the group consisting of trichloroacetophenone, 2,2-diethoxy acetophenone, 2,2-dimethoxy-2-phenylacetophenone, benzophenone, methyl benzophenone, p-chlorobenzophenone, and p-dimethylamino benzophenone.

14. A composition according to claim 1, wherein the composition further comprises at least one ingredient selected from the group consisting of storage stabilizers free of mercapto groups, a filler, an organopolysiloxane gum, a plasticizer, a thixotropic donor, a high-temperature additive, a coloring agent, and an adhesion donor.

15. A composition according to claim 11, wherein the composition further comprises at least one ingredient selected from the group consisting of storage stabilizers free of mercapto groups, a filler, an organopolysiloxane gum, a plasticizer, a thixotropic donor, a high-temperature additive, a coloring agent, and an adhesion donor.

16. A hardenable organopolysiloxane composition having a viscosity of less than 30,000 Poise at 25° C. obtained by a method comprising:

(I) mixing:
(A) 30 to 75 wt. % of a silicone resin having the average unit formula $R_a^1SiO_{(4-a)/2}$ wherein R$^1$ is selected from the group consisting of monovalent hydrocarbon groups and alkoxy groups with the proviso that R$^1$ contains at least 80 mole % monovalent hydrocarbon groups and that at least 2 mole % of the monovalent hydrocarbon groups are alkenyl groups, and a is a number between 0.75 and 2.5;

(B) 70 to 25 wt. % of an organopolysiloxane having a viscosity of 1 to 1000 Poise at 25° C. and having at one of its terminals a mercaptosiloxy group having the formula

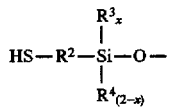

wherein R$^2$ is an alkylene group having 1 to 10 carbon atoms, R$^3$ is an alkoxy group, R$^4$ is an alkyl group, and x has a value of 1 or 2, the organopolysiloxane being free of alkenyl groups;

(C) 0.1 to 10 parts by weight per 100 parts by weight of (A)+(B) of an organosilane having the formula (HSR$^5$)R$_y^6$SiR$_{(3-y)}^7$ wherein R$^5$ is an alkylene group having from 1 to 10 carbon atoms, R$^6$ is an alkoxy group, R$^7$ is an alkyl group, and y is an integer from 1 to 3; and (D) 0.01 to 10 parts by weight per 100 parts by weight of (A)+(B) of a condensation catalyst.

17. A composition according to claim 16, wherein (A) is a silicone resin having its formula selected from (R$_3^8$SiO$_{1/2}$)$_b$(SiO$_{4/2}$)$_c$ or (R$_3^8$SiO$_{1/2}$)$_d$(R$^8$SiO$_{3/2}$)$_e$(SiO$_{4/2}$)$_f$(R$^9$O$_{1/2}$)$_g$ wherein R$^8$ denotes a monovalent hydrocarbon group containing alkenyl groups in an amount of more than 2 mole %, R$^9$ denotes an alkyl group, the ratio of b/c and d/f is from 0.2 to 1.5, the ratio of e/f is from 0.05 to 0.2, and the ratio of g/f is from 0.05 to 0.6.

18. A composition according to claim 16, wherein (A) is selected from the group consisting of (Me$_3$SiO$_{1/2}$)$_{36}$(Me$_2$ViSiO$_{1/2}$)$_5$(SiO$_{4/2}$)$_{59}$, (Me$_3$SiO$_{1/2}$)$_{40}$(Me$_2$ViSiO$_{1/2}$)$_5$(SiO$_{4/2}$)$_{55}$, (Me$_3$SiO$_{1/2}$)$_{36}$(Me$_2$ViSiO$_{1/2}$)$_5$(MeSiO$_{3/2}$)$_5$(SiO$_{4/2}$)$_{59}$, (Me$_3$SiO$_{1/2}$)$_{40}$(ViSiO$_{3/2}$)$_7$(SiO$_{4/2}$)$_{60}$(MeO$_{1/2}$)$_{10}$, (Me$_3$SiO$_{1/2}$)$_{36}$(Me$_2$ViSiO$_{1/2}$)$_5$(MeSiO$_{3/2}$)$_5$(SiO$_{4/2}$)$_{59}$(MeO$_{1/2}$)$_{15}$, and (Me$_3$SiO$_{1/2}$)$_{35}$(Me$_2$ViSiO$_{1/2}$)$_5$(SiO$_{4/2}$)$_{60}$(MeO$_{1/2}$)$_{10}$.

wherein Me denotes methyl and Vi denotes vinyl.

19. A composition according to claim 16, wherein (B) is selected from the group consisting of

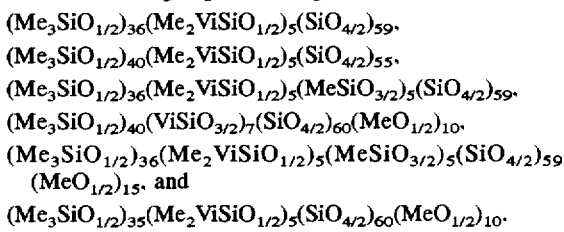

HS(CH$_2$)$_3$—SiO—(SiO)$_{600}$Si—(CH$_2$)$_3$SH, (with OMe and Me substituents)

HS(CH$_2$)$_3$—SiO—(SiO)$_{300}$(SiO)$_{10}$Si(CH$_2$)$_3$SH, (with OMe, Me, Ph, OMe substituents)

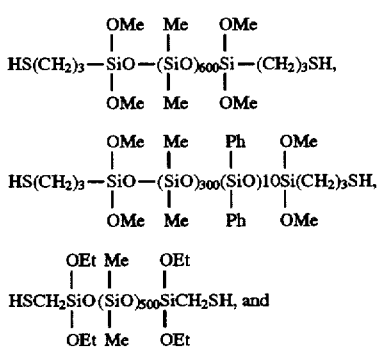

HSCH$_2$SiO(SiO)$_{500}$SiCH$_2$SH, and (with OEt and Me substituents)

-continued

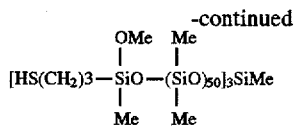

wherein Me denotes methyl, Et denotes ethyl, and Ph denotes phenyl.

20. A composition according to claim 16, wherein (C) is selected from the group consisting of $HS(CH_2)_3Si(OMe)_3$, $HS(CH_2)_4Si(OMe)_3$, $HS(CH_2)_3Si(OEt)_3$, $HS(CH_2)_3SiMe(OEt)_2$, and $HSCH_2Si(OMe)_3$ wherein Me denotes methyl and Et denotes ethyl.

21. A composition according to claim 16, wherein (D) is selected from the group consisting of tetraalkoxy titanium compounds, titanium complexes, dialkyltin carboxylate compounds, and tin carboxylate compounds.

22. A composition according to claim 16, wherein (D) is selected from the group consisting of tetraisopropoxy titanium, tetrabutoxy titanium, diisopropoxybis(acetoacetic ethyl) titanium, diisopropoxybis(acetylacetone) titanium, dibutoxybis- (acetoacetic methyl) titanium, dibutyltin diacetate, dibutyltin dioctoate, dibutyltin dilaurate, and stannous octoate.

23. A composition according to claim 16, wherein the method further comprises adding, during step (I), (E) a radical optical polymerization initiator.

24. A composition according to claim 23, wherein (E) is selected from the group consisting of acetophenones and benzophenones.

25. A composition according to claim 23, wherein (E) is selected from the group consisting of trichloroacetophenone, 2,2-diethoxy acetophenone, 2,2-dimethoxy-2-phenyl-acetophenone, benzophenone, methyl benzophenone, p-chlorobenzophenone, and p-dimethylamino benzophenone.

26. A composition according to claim 16, wherein the method further comprises adding, during step (I), at least one ingredient selected from the group consisting of storage stabilizers free of mercapto groups, a filler, an organopolysiloxane gum, a plasticizer, a thixotropic donor, a high-temperature additive, a coloring agent, and an adhesion donor.

27. A composition according to claim 23, wherein the method further comprises adding, during step (I), at least one ingredient selected from the group consisting of storage stabilizers free of mercapto groups, a filler, an organopolysiloxane gum, a plasticizer, a thixotropic donor, a high-temperature additive, a coloring agent, and an adhesion donor.

28. An article of manufacture prepared by:
(I) applying a hardenable organopolysiloxane composition having a viscosity of less than 30,000 Poise at 25° C. to at least one surface of a substrate, wherein the hardenable organopolysiloxane composition is obtained by a method comprising mixing:

(A) 30 to 75 wt. % of a silicone resin having the average unit formula $R_a^1SiO_{(4-a)/2}$ wherein $R^1$ is selected from the group consisting of monovalent hydrocarbon groups and alkoxy groups with the proviso that $R^1$ contains at least 80 mole % monovalent hydrocarbon groups and that at least 2 mole % of the monovalent hydrocarbon groups are alkenyl groups, and a is a number between 0.75 and 2.5;

(B) 70 to 25 wt. % of an organopolysiloxane having a viscosity of 1 to 1000 Poise at 25° C. and having at one of its terminals a mercaptosiloxy group having the formula

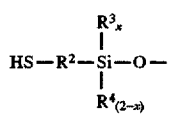

wherein $R^2$ is an alkylene group having 1 to 10 carbon atoms, $R^3$ is an alkoxy group, $R^4$ is an alkyl group, and x has a value of 1 or 2, the organopolysiloxane being free of alkenyl groups;

(C) 0.1 to 10 parts by weight per 100 parts by weight of (A)+(B) of an organosilane having the formula $(HSR^5)R_y^6SiR_{(3-y)}^7$ wherein $R^5$ is an alkylene group having from 1 to 10 carbon atoms, $R^6$ is an alkoxy group, $R^7$ is an alkyl group, and y is an integer from 1 to 3; and (D) 0.01 to 10 parts by weight per 100 parts by weight of (A)+(B) of a condensation catalyst; and (II) exposing the hardenable organopolysiloxane composition and the substrate to high energy radiation in an amount sufficient to cure the composition.

29. An article of manufacture according to claim 28, wherein the article is further prepared by (III) contacting a solid support with the substrate having the hardenable organopolysiloxane composition cured thereon after step (II) whereby the solid support and the substrate are adhered together.

30. An article of manufacture according to claim 29, wherein the substrate and solid support are each selected from the group consisting of glass plates, copper plates, iron plates, stainless steel plates, aluminum plates, zinc plates, high-quality paper, low-grade paper, polyester resin films, polycarbonate resin films, polystyrene films, acrylic resin films, methacrylic resin films, nylon resin films, natural fibers, synthetic fibers, natural rubbers, and synthetic rubbers.

* * * * *